United States Patent [19]

Hampton et al.

[11] Patent Number: 5,690,066

[45] Date of Patent: Nov. 25, 1997

[54] ENGINE VALVE CONTROL ACTUATOR WITH KNEE ACTION LINKAGE

[75] Inventors: Keith Hampton, Ann Arbor; David M. Preston, Clarkston, both of Mich.

[73] Assignee: Eaton Corporation, Cleveland, Ohio

[21] Appl. No.: 723,078

[22] Filed: Sep. 30, 1996

[51] Int. Cl.[6] .............................. F01L 1/18; F01L 13/00; F02D 13/06
[52] U.S. Cl. .............................. 123/90.16; 123/198 F; 123/90.44
[58] Field of Search .................. 123/90.11, 90.15, 123/90.16, 90.17, 90.22, 90.27, 90.39, 90.41, 90.43, 90.44, 90.46, 198 F

[56] References Cited

U.S. PATENT DOCUMENTS

| | | | |
|---|---|---|---|
| 4,151,817 | 5/1979 | Mueller | 123/90.16 |
| 4,203,397 | 5/1980 | Soeters, Jr. | 123/90.16 |
| 4,762,096 | 8/1988 | Kamm et al. | 123/90.16 |
| 5,415,137 | 5/1995 | Paul | 123/90.16 |
| 5,524,580 | 6/1996 | Muir | 123/198 F |
| 5,544,626 | 8/1996 | Diggs et al. | 123/198 F |

*Primary Examiner*—Weilun Lo
*Attorney, Agent, or Firm*—Loren H. Uthoff, Jr.

[57] ABSTRACT

A latchable rocker arm is actuated with a solenoid device having a stator and an armature where the armature is connected to an output link which is connected to a first connecting link and a second connecting link which are disposed to form a "knee" linkage where in the fully actuated state the first connecting link and the second connecting link are in substantial axial alignment. A pivoted output link is connected to the first connecting link for contacting and actuating the latchable rocker arm.

15 Claims, 3 Drawing Sheets

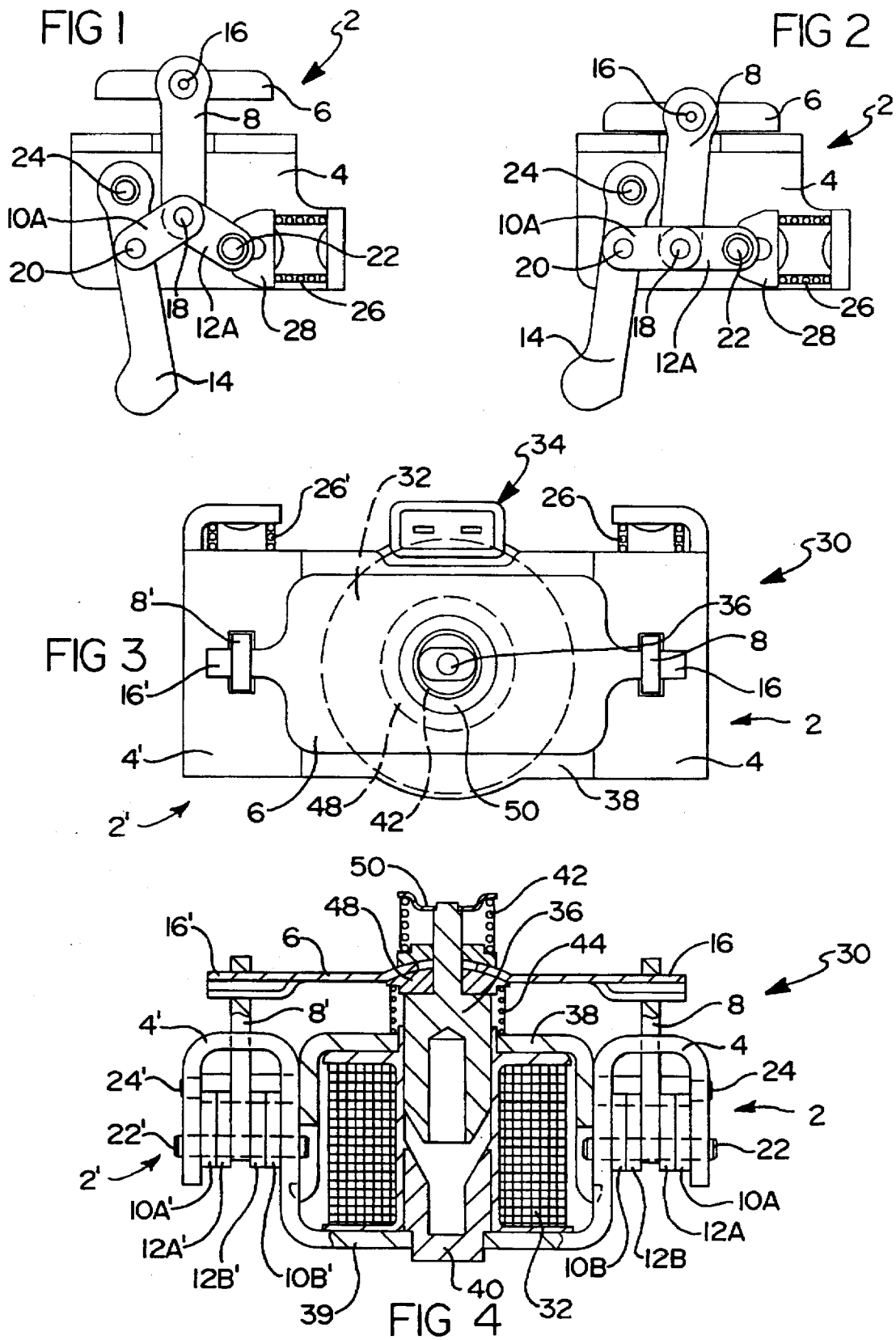

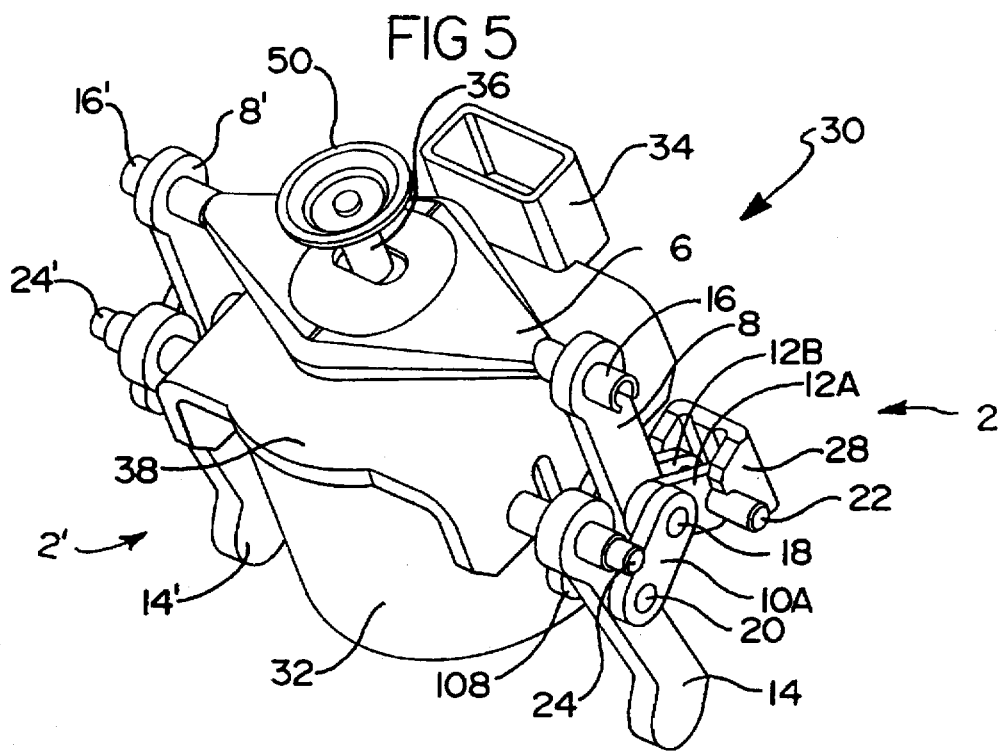
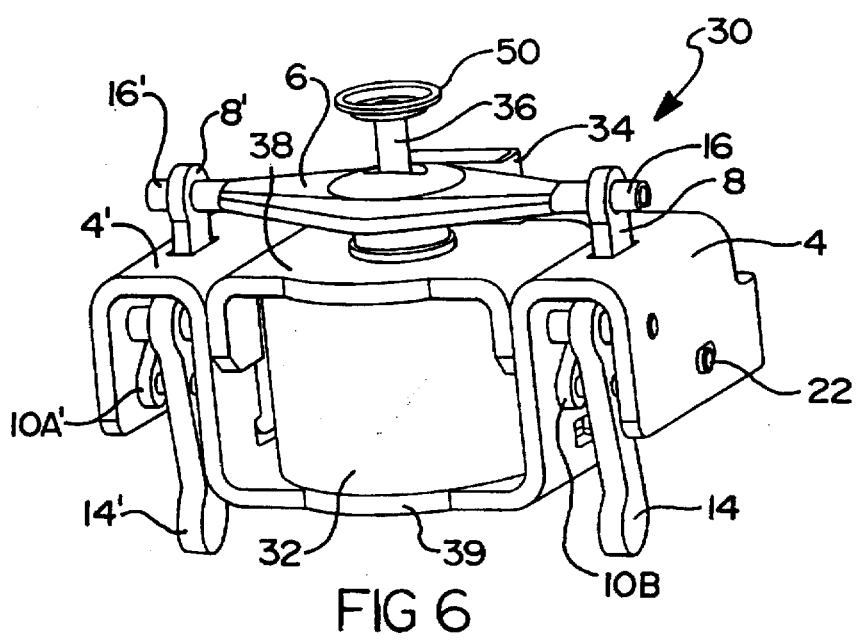

ENGINE VALVE CONTROL ACTUATOR WITH KNEE ACTION LINKAGE

RELATED APPLICATIONS

The present application is related to patent applications USSN: 08/622,239 entitled "Engine Valve Control System Using A Latchable Rocker Arm Activated by A Solenoid Mechanism" and USSN: 08/540,280 entitled "Engine Valve Control System Using A Latchable Rocker Arm" both assigned to the same assignee, Eaton Corporation, of this application.

BACKGROUND OF THE INVENTION

1. Field of the Invention

The present invention relates to an engine valve control actuator and more specifically, to a latchable engine valve control system where a knee action linkage is connected to a solenoid.

2. Description of the Prior Art

Variable valve control systems for multiple valve engines wherein the intake and/or exhaust valves can either be selectively actuated or actuated with various lift profiles are well known in the art. Example systems are shown in U.S. Pat. Nos. 4,151,817 and 4,203,397 the disclosures of which are hereby incorporated by reference except those portions which also incorporate by reference. U.S. Pat. No. 4,151,817 discloses a primary rocker arm element engageable with a first cam profile, a secondary rocker arm element engageable with a second cam profile, and means to interconnect or latch the primary and secondary rocker arm elements. U.S. Pat. No. 4,203,397 discloses an apparatus to selectively engage or disengage an engine poppet valve so as to connect or disconnect the engine valve from the balance of the valve gear using a latch mechanism thereby causing the valve to operate or remain stationary.

Generally, latchable rocker arm mechanisms known in the prior art require a relatively high activation force to shift the mechanism from an operable to an inoperable state. Typical solenoid actuators, when used with prior art mechanisms, provide a high force level so that synchronization with the valve gear is not required and thus require a large package size and/or a high level of electrical current for actuation. If a cam position synchronization capability is available, then a relatively low force producing solenoid can be used since the latchable rocker arm is only deactivated when the valve is closed and the internal loads on the latch mechanism are at a minimum. This synchronization can be provided by a sensor and electronic control unit or mechanically by a preload spring. If electronic synchronization capability is not available, then a special spring loaded linkage can be adapted to the rocker arm to allow the solenoid to fully engage and preload the rocker arm for automatic activation when the valve gear unloads when the engine valve closes.

Some type of bellcrank or other type of travel amplification system is usually required due to the relatively low travel output of the solenoid. A bellcrank linkage is disclosed in U.S. patent application USSN: 08/540,280 which operates to mechanically increase and translate the motion of a solenoid to the latchable rocker arm but does not provide a high lock-in force at maximum travel which would conserve energy.

SUMMARY OF THE INVENTION

In accordance with the principles of the present invention, a knee type linkage is used in an actuator to transfer the motion of an electrical solenoid to a latchable rocker arm. The knee linkage provides an increasing mechanical advantage and a very high lock-in force at the point of maximum travel to accommodate the forces generated by the latch mechanism of the latchable rocker arm. The present invention thus results in a reduced force level output requirement for the solenoid thereby reducing the size of the solenoid for improved packaging parameters and energy consumption as compared to prior art devices.

The knee linkage of the present invention has first and second connecting links and a primary link with an electrical solenoid acting on the primary link. The first connecting link is attached to an output link which is pivoted on the solenoid frame. The output link contacts and actuates the latchable rocker arm. The second connecting link is attached to a return spring where the return spring reacts against the solenoid frame to return the knee linkage to its nonactivated position upon deenergization of the solenoid.

When the solenoid is deactivated, the knee linkage is bent at a center pivot, where the center pivot rotatably connects the primary link, the first connecting link and the second connecting link. When the solenoid is activated, the center pivot is forced into a position where the first pivot, the second pivot and the center pivot lie approximately along a common axis thereby providing an extremely high lock-in force and a mechanical advantage for a reduction in the required force that the solenoid must produce for actuation.

BRIEF DESCRIPTION OF THE DRAWINGS

FIG. 1 is a cross-sectional view of the actuator linkage of the present invention in a deactivated state;

FIG. 2 is a cross-sectional view of the actuator linkage of the present invention in an activated state;

FIG. 3 is a top view of the actuator of the present invention;

FIG. 4 is a cross-sectional view of the actuator of the present invention;

FIG. 5 is a partial perspective view of the actuator of the present invention;

FIG. 6 is a perspective view of the actuator of a present invention; and

DETAILED DESCRIPTION OF THE PREFERRED EMBODIMENT

Figure 7:
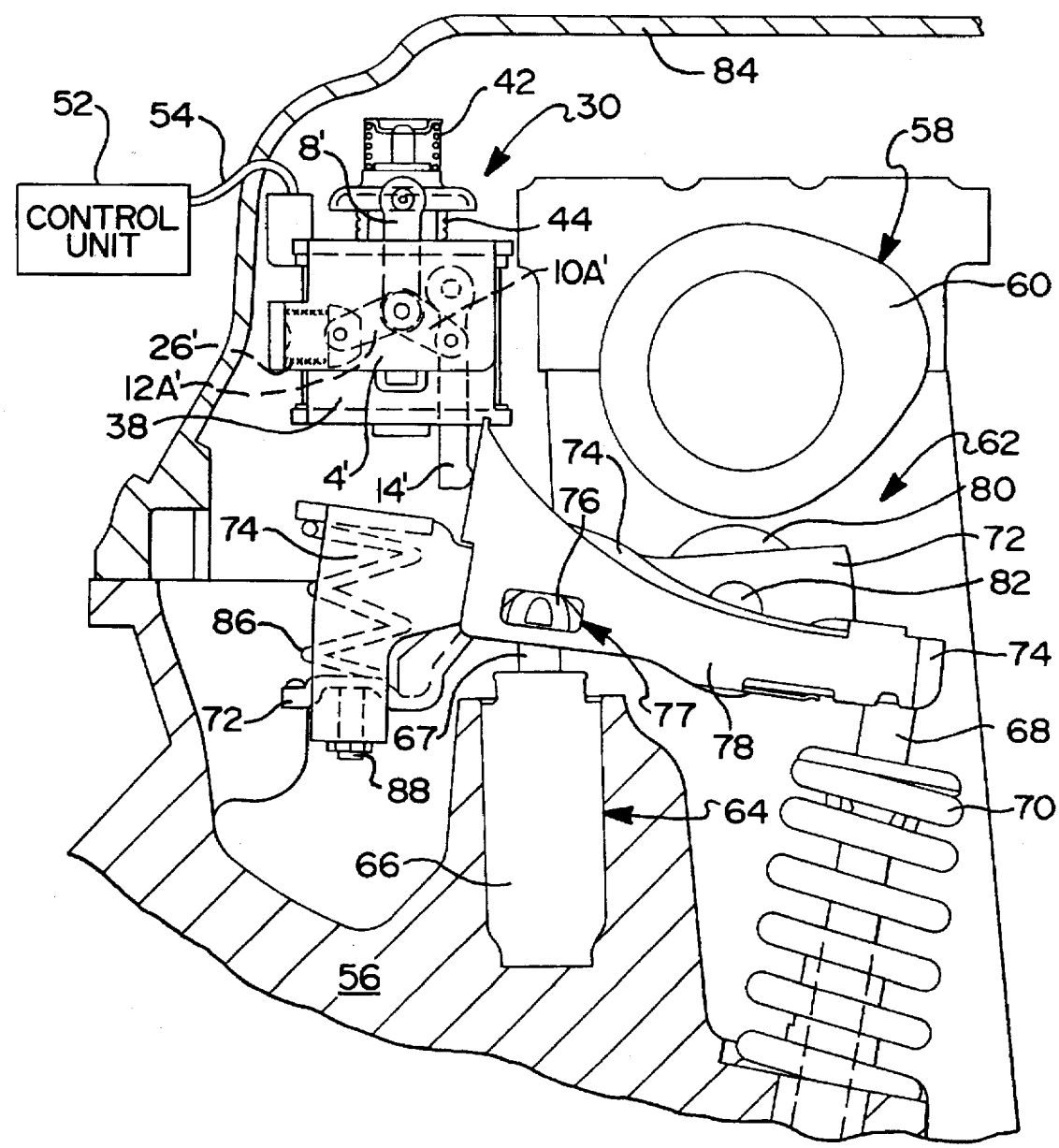
FIG. 7 is a cross-sectional view of the latchable rocker arm assembly of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Certain terminology will be used in the following description for convenience in reference only and will not be limiting. The terms "rightward" and "leftward" will refer to directions in the drawings in connection with which the terminology is used. The terms "inwardly" and "outwardly" will refer to directions toward and away from, respectively, the geometric center of the actuator. The terms "upward" and "downward" will refer to directions as taken in the drawings in connection with which the terminology is used.

All foregoing terms mentioned above include the normal derivatives and equivalents thereof.

Now referring to FIG. 1 of the drawings, a cross-sectional view of the actuator linkage 2 of the present invention is shown in a deactivated state. The actuator linkage 2 is largely contained within a linkage housing 4. An actuator plate 6 is electromagnetically forced downward upon activation of a solenoid coil 32 (see FIG. 3) and serves to supply a downward force to a primary link 8 which in turn causes first connecting link 10A and second connecting link 12A to move and operate against output link 14. The primary link 8 is rotatably supported on pin 16 which extends from the actuator plate 6 at a first end of primary link 8 and is rotatably supported on pin 18 at a second end of primary link 8. The first connecting link 10A is supported at a first end by pin 18 and at a second end by pin 20 where pin 20 is connected to output link 14. The second connecting link 12A is rotatably connected to pin 18 at a first end and rotatably connected to pin 22 at a second end where pin 22 is driven against the linkage return spring 26 through the end cap 28 where the linkage return spring 26 is supported at a first end at the return end cap 28 and at a second end at the linkage housing 4. The output link 14 is rotatably supported on pin 24 and is actuated through movement of the first connecting link 10A through the pin 20.

Now referring to FIG. 2, the actuator linkage 2 of the present invention is shown in an actuated state where the actuator plate 6 has been moved downward by electromagnetic attraction to solenoid coil 32 (see FIG. 3) to move the primary link 8 downward causing the first connecting link 10A to tend to become coaxially aligned with the second connecting link 12A thereby causing the output link 14 to move laterally in a leftward direction. If the output link 14 is forced to move in a rightward direction, then the linkage return spring 26 would become compressed by the end cap 28 the condition of which is not illustrated in FIG. 2. Generally, the force generated by the linkage return spring 26 must exceed the maximum force needed to activate the device to be actuated such as latchable rocker arm 62 (see FIG. 7). The knee action of the first connecting link 10A and the second connecting link 12A results in an increase in the mechanical advantage as the primary link 8 is moved downward by the actuator plate 6 eventually reaching the configuration shown in FIG. 2 where the first connecting link 10A and the second connecting link 12A are in appropriate axial alignment to accommodate manufacturing tolerances, the first connecting link 10A and the second connecting link 12A could actually move past the axial alignment position and could be limited by a mechanical stop (not shown).

FIG. 3 is the top view of the actuator 30 of the present invention which includes the coil 32 which is connected to a source of electrical excitation through connector 34. An armature 36 causes the actuator plates 6 to be pulled downwardly against the coil 32 thereby causing the pins 16 and 16' to move which are connected to the primary links 8 and 8' to move downward thereby causing the actuator linkage 2 to become activated as shown in FIG. 2. The coil 32 is contained within the upper solenoid housing 38 which can be a stamped metal piece which is in turn mechanically connected to a lower solenoid housing 39 where the lower solenoid housing 39 extends to form both the linkage housing 4 on the right side of the actuator 30 and the linkage housing 4' on the lefthand side of the actuator 30. The actuator linkage 2 is shown on the right side of the actuator 30 and a mirror image of actuator linkage 2 is mounted to the left side of the lower solenoid housing 39 and will be hereinafter referred to as the left actuator linkage 2'. Likewise, the primary link 8 is duplicated and installed on the left actuator linkage 2' and labeled as primary link 8' and the leftward extending pin 16' is substantially identical to the pin 16 described with respect to actuator linkage 2. Also shown in FIG. 3 are the right linkage return spring 26 and the left linkage return spring 26'. In this manner, the right actuator linkage 2 can serve to actuate a first latchable rocker arm while the left actuator linkage 2' can actuate a second latchable rocker arm both using the same solenoid coil 32.

Now referring to FIG. 4 of the drawings, a cross-sectional view of the actuator 30 of the present invention is shown. Again, note that the mechanics of the right actuator linkage 2 is duplicated in the left actuator linkage 2' along with the components that make up the right and left actuator linkages 2 and 2' including right and left primary links 8 and 8'; right outer and inner first connecting links 10A and 10B; right outer and inner second connecting links 12A and 12B; right and left pins 22 and 22'; right and left pins 24 and 24'; left outer and inner first connecting links 10A' and 10B'; and left outer and inner second connecting links 12A' and 12B'. Thus, whenever reference is made to elements contained within the right actuator linkage 2 identical form, fit and function can be translated to the elements contained within the left actuator linkage 2'.

An actuation spring 42 operates between the actuator plate 6 and armature 36 where the armature 36 passes through the center of the actuator plate 6 with mechanical support in only one direction through the pivot washer 48 which sits on top of the armature 36. Thus, when the coil 32 is energized, the armature 36 moves downward to contact the stator 40 acting against actuation spring 42 which reacts against the retainer 50 which is attached to the armature 36. If the actuator plate 6 cannot move downward due to the internal forces on the latchable rocker arm 62 (see FIG. 7), the actuation spring 42 is compressed so as to preload the actuator plate 6. A return spring 44 operates between the actuator plate 6 and the upper solenoid housing 38 thereby forcing the actuator plate 6 away from the upper solenoid housing 38 when the coil 32 is deenergized. The actuator plates 6 sits on the pivot washer 48 where the pivot washer 48 contacts and is supported by the armature 36. The pivot washer 48 is radiused such that the actuator plate 6 can rock with respect to the armature 36 thereby allowing both the right and left actuator linkages 2 and 2' to be actuated independently or together.

The armature 36 is electromagnetically attracted to the stator 40 when the coil 32 is electrically energized through electrical connector 34. The coil 32 is contained and supported within the lower solenoid housing 39 and the upper solenoid housing 38. Thus, when the coil 32 is electrically energized, the armature 36 moves downward toward and contacts the stator 40 thereby tending to compress the actuator spring 42 providing a downward force against the actuator plate 6. If the actuator plate 6 is unable to move, then the actuator spring 42 comes compressed and provides a preload on the actuator plate 6 moving the actuator plate 6 when the right actuator linkage 2 or the left actuator linkage 2' becomes free to move. After the electrical current to the coil 32 is removed, the armature 36 moves away from the stator 40 by action of the return spring 44.

The right actuator linkage 2 consists of a right primary link 8 which is attached to the actuator plate 6 at the pin 16 at a first end of the right primary link 8. A second end of primary link 8 is rotatably connected to the right outer first connecting link 10A and the right inner first connecting link 10B by pin 18. The second end of primary link 8 is also rotatably connected to the right outer second connecting link 12A and the inner second connecting link 12B by pin 18. Thus, the right primary link 8 is coupled to two pairs of links: the right inner and outer first connecting links 10A, 10B and the right inner and outer second connecting links 12A,12B. Not shown in the particular cross-section of FIG. 4 are the right output link 14 and the left output link 14' although the pins 24 and 24' on which the output links 14 and 14' rotate are shown.

Now referring to FIG. 5 of the drawings, a partial perspective view of the actuator 30 of the present invention is shown with the right linkage housing 4 and left linkage housing 4' removed and the lower solenoid housing 39 removed for illustrative purposes. In addition, the actuation spring 42 is not shown. Referring specifically to the right actuator linkage 2 more clearly illustrated is the functioning of the right primary link 8 which is supported and moved with the actuator plate 6 by the right pin 16. The right primary link 8 is connected at a second end to pin 18. Pin 18 rotatably engages both the right first connecting links 10A and 10B where the right outer and inner first connecting links 10A and 10B are connected to right output link 14 with pin 20. Likewise, the right outer and inner second connecting links 12A and 12B are rotatably connected to the primary link 8 through pin 18 at their first ends and are engaged to the end cap 28 through pin 22 at second ends of the right outer and inner second connecting links 12A and 12B. The right output link 14 is rotatably supported by pin 24 such that vertical movement of the right primary link 8 translates into a rotary motion of the right output link 14 about the pin 24 when the coil 32 is energized. In an identical manner, the left actuator linkage 2' operates with left primary link 8' operating to move the left output link 14' as the actuator plate 6 is moved upward and downward by electromagnetic attraction of the coil 32 and the return spring 44.

Now referring to FIG. 6 of the drawings, a second perspective view of the actuator 30 of the present invention is shown. For clarity, the actuation spring 42 has also been omitted in this figure. The lower solenoid housing 39 which extends to form both the right hand linkage housing 4 and the lefthand linkage housing 4' is shown and is attached to the upper solenoid housing 38. The pin 22 which is attached to the right outer and inner second connecting links 12A and 12B is shown moving in a slot formed in the linkage housing 4 against the linkage return spring 26 should the right output link 14 be in a nonmoveable state. Many of the elements previously described in relation to FIG. 5 are shown.

FIG. 7 of the drawings is a cutaway view of the actuator 30 of the present invention adapted to operate a latchable rocker arm 62 as more fully shown and described in patent application USSN: 08/622,239 filed on Mar. 22, 1996 and assigned to the same assignee Eaton Corporation as this application the disclosure of which is hereby expressly incorporated by reference. The actuator 30 of the present invention along with the latchable rocker arm 62 is adapted to and shown as installed as part of the valve train on an internal combustion engine. A portion of the engine cylinder head 56 of an internal combustion engine of the overhead cam type is shown along with the camshaft 58, the hydraulic lash adjuster 64, the engine poppet valve 68, the valve spring 70 and the valve cover 84.

As illustrated herein, the latchable rocker arm 62 is of the type which is particularly adapted to selectively activate or deactivate an engine poppet valve 68 and comprises a mechanism which is shiftable between an active mode wherein it is operable to open the engine poppet valve 68 in response to the motion of the cam 58, and an inactive mode wherein the engine valve 68 is not opened by action of the cam 58.

The latchable rocker arm 62 comprises an inner rocker arm 72 which is engagable with the cam 58 at the cam lobe 60 supported on the cylinder head 56 of the engine and an outer rocker arm 74 which is engagable with the engine poppet valve 68 which is maintained normally closed by a valve spring 70. A biasing spring 86 operates between the inner rocker arm 72 and the outer rocker arm 74 so as to the bias the inner rocker arm 72 for engagement with the cam lobe 60 through the roller 80 and the outer rocker arm 74 into engagement with the plunger 67 which rides in the main body 66 of the lash adjuster 64. The construction and the function of the lash adjuster 64 are well known in the art and will not be described in detail herein. The biasing spring 86 applies sufficient force to the plunger 67 to keep the lash adjuster 64 operating in its normal range at all times. The roller 80 is rotatably supported on the inner rocker arm 72 by roller pin 82. The load on the spring 86 can be adjusted by load adjuster 88.

A latch member 78 is slidably received on the outer rocker arm 74 and biased into a "latched" condition by a latch. spring (not shown) that supplies a force between the latch member 78 and the outer rocker arm 74. The latch member 78 is effective to link the inner and outer rocker arms 72 and 74 so that they move together to define the "active mode" of the engine poppet valve latchable rocker arm 62 of the present invention (as shown in FIG. 7) or to unlatch them where the inner rocker arm 72 is free to rotate relative to the outer rocker arm 74 to define the "inactive mode". A link pin 76 is rotatably supported on top of the plunger 67 and provides support for the inner rocker arm 72 and thus such that the inner rocker arm 72 is free to rotate relative to the plunger 67 and/or the link pin 76 whereas the outer rocker arm 74 is nonrotatably linked to the link pin 76 and is thus free to rotate relative to the plunger 67 and the inner rocker arm 72. Thus, when the latch member 78 is moved into the inactive mode, the inner rocker arm 72 is free to rotate relative to the outer rocker arm 74 thereby providing for a disengagement of the cam lob 60 from the engine valve 68.

The latchable rocker arm 62 is switched from an active mode into an inactive mode by translation of the latch member 78 on the outer rocker arm 74. In FIG. 7, the latch member 78 is shown in an intermediate position where the latch member 78 still engages the inner rocker arm 72 thereby linking rotation of the inner rocker arm 72 to the outer rocker arm 74 thus maintaining the active mode and operation of the engine valve 68 in response to the cam lobe 60. The actuator 30 has been partially energized where the actuator plate 6 has been pulled partially downward by electrical excitation of the coil 32 by the control unit 52 through electrical leads 54. The primary link 8' has moved downward thereby causing the left first connecting link 10A' and 10B' to extend in a knee action with respect to the left second connecting links 12A' and 12B' thereby axially displacing the left output link 14' against the latch member 78.

While the invention has been illustrated and described in some detail in the drawings and foregoing description, the same is to be considered as illustrative and not restrictive in character, it being understood that only the preferred embodiment has been shown and described and that all changes and modifications that come within the spirit of the invention are to be considered within the scope of the invention and only limited by the following claims.

We claim:

1. An electromagnetic actuator for activating an engine latchable rocker arm comprising:

a linkage housing;

a solenoid housing attached to said linkage housing;

a coil for creating an electromagnetic field upon introduction of an electrical current disposed within said solenoid housing;

a stator disposed within said coil;

an armature extending into said coil within relatively close proximity to said stator where said armature contacts Said stator when said coil is energized;

a return spring for applying a separation force between said armature and said stator;

an actuator plate slidingly connected to said armature and adapted to be forced toward said coil by said armature upon introduction of an electrical current into said coil by said armature;

a primary link having a first end connected to said actuator plate and a second end disposed within a cavity in said linkage housing;

an output link rotatably connected to said linkage housing and extending to contact said engine latchable rocker arm;

a first connecting link having a first end rotatably connected to said second end of said primary link and having a second end rotatably connected to said linkage housing;

a second connecting link having a first end rotatably connected to said second end of said primary link and having a second end rotatably connected to said output link; and wherein when said electromagnetic actuator is energized, said first connecting link is in substantial axial alignment with said second connecting link.

2. The electromagnetic actuator of claim 1, further comprising a linkage return spring disposed between said second end of said first connecting link and said linkage housing.

3. The electromagnetic actuator of claim 1, wherein said linkage housing extends to form a right linkage housing and a left linkage housing.

4. The electromagnetic actuator of claim 1, further comprising an armature preload spring acting in compression between said armature and said actuator plate.

5. The electromagnetic actuator of claim 1, further comprising a pivot washer attached to said armature and adapted to rotatably support said actuator plate.

6. The electromagnetic actuator of claim 1, wherein said first connecting link comprises an inner first connecting link and an outer first connecting link, where said primary link is positioned between said inner first connecting link and said outer first connecting link, and wherein said second connecting link comprises an inner second connecting link and an outer second connecting link, where said primary link is positioned between said inner second connecting link and said outer second connecting link.

7. The electromagnetic actuator of claim 1, wherein said first connecting link is connected to said primary link with a pin and wherein said second connecting link is connected to said primary link with said pin.

8. The electromagnetic actuator of claim 1, wherein said armature has a frusto-conical end portion to contact a matching receiving shape formed in said stator.

9. An electromagnetic actuator for activating an engine latchable rocker arm comprising:

a solenoid housing;

a right linkage housing joined to said solenoid housing;

a left linkage housing joined to said solenoid housing;

a coil for creating an electromagnetic field upon introduction of an electrical current disposed within said solenoid housing;

a stator disposed within said coil;

an armature extending into said coil within relatively close proximity to said stator where said armature contacts said stator when said coil is energized;

a return spring for applying a separation force between said armature and said stator;

an actuator plate slidingly connected to said armature and adapted to be forced toward said coil by said armature upon introduction of an electrical current into said coil;

a right primary link having a first end connected to said actuator plate and a second end extending into said right linkage housing;

a left primary link having a first end connected to said actuator plate and a second end extending into said left linkage housing;

a right output link rotatably connected to said right linkage housing and extending to contact a first latchable rocker arm;

a left output link rotatably connected to said left linkage housing and extending to contact a second latchable rocker arm;

a right first connecting link having a first end rotatably connected to said second end of said right primary link;

a left first connecting link having a first end rotatably connected to said second end of said left primary link;

a right second connecting link having a first end rotatably connected to said second end of said right primary link and having a second end rotatably connected to said right output link;

a left second connecting link having a first end rotatably connected to said second end of said left primary link and having a second end rotatably connected to said left output link; and where when said electromagnetic actuator is energized, said right and left first connecting links are in substantial axial alignment with said right and left second connecting links.

10. The electromagnetic actuator of claim 9, further comprising a right linkage return spring disposed between said second end of said right first connecting link and said linkage housing and a left linkage return spring disposed between said second end of said left first connecting link and said linkage housing.

11. The electromagnetic actuator of claim 9, further comprising an armature preload spring acting in compression between said armature and said actuator plate.

12. The electromagnetic actuator of claim 9, further comprising a pivot washer attached to said armature and adapted to rotatably support said actuator plate.

13. The electromagnetic actuator of claim 9, wherein said right first connecting link comprises an inner right first connecting link and an outer right first connecting link where said right primary link is positioned between said inner right first connecting link and said outer right first connecting link and wherein said right second connecting link comprises an inner right second connecting link and an outer second connecting link where said right primary link is positioned between said inner right second connecting link and said outer right second connecting link and wherein said left first connecting link comprises an inner left first connecting link and an outer left first connecting link where said left primary link is positioned between said inner left first connecting link and said outer left first connecting link and wherein said left second connecting link comprises an inner left second connecting link and an outer left second connecting link where said left primary link is positioned between said inner left second connecting link and said outer left second connecting link.

14. The electromagnetic actuator of claim 9, wherein said right first connecting link is connected to said right primary link with a pin and wherein said left first connecting link is connected to said left primary link with a pin and wherein said right second connecting link is connected to said right primary link with a pin and wherein said left second connecting link is connected to said left primary link with a pin.

15. A valve control system for an internal combustion engine including a cylinder head, an engine poppet valve and a camshaft having a cam lobe formed thereon, said control system comprising:

a lash adjuster mounted on said cylinder head having a plunger;

a link pin adapted to pivot on said plunger;

an outer rocker arm nonrotatably supported on said link pin and engageable with said engine poppet valve;

an inner rocker arm having a saddle portion for rotatably contacting said link pin and adapted for rotation relative to said outer rocker arm, said inner rocker arm engaging said cam lobe;

a biasing spring contacting said inner rocker arm and said outer rocker arm for forcing said outer rocker arm into engagement with said poppet valve and said inner rocker arm into contact with said cam lobe;

a slidable latch member for selectively linking said inner rocker arm and said outer rocker arm for rotation in unison with said link pin about said pivot point in response to a force applied by said cam lobe to said inner rocker arm, and for selectively unlinking said inner and said outer rocker arms for independent rotation, said latch member extending from approximately one end of said outer rocker arm at said poppet valve along said outer rocker arm toward said link pin;

a linkage housing;

a solenoid housing attached to said linkage housing;

a coil for creating an electromagnetic field upon introduction of an electrical current disposed within said solenoid housing;

a stator disposed within said coil;

an armature extending into said coil within relatively close proximity to said stator where said armature contacts said stator when said coil is energized;

a return spring for applying a separation force between said armature and said stator;

an actuator plate slidingly connected to said armature and adapted to be forced toward said coil by said armature upon introduction of an electrical current into said coil by said armature;

a primary link having a first end connected to said actuator plate and a second end disposed within a cavity in said linkage housing;

an output link rotatably connected to said linkage housing and extending to contact said engine latchable rocker arm;

a first connecting link having a first end rotatably connected to said second end of said primary link and having a second end rotatably connected to said linkage housing;

a second connecting link having a first end rotatably connected to said second end of said primary link and having a second end rotatably connected to said output link; and wherein when said electromagnetic actuator is energized, said first connecting link is in substantial axial alignment with said second connecting link.

\* \* \* \* \*